No. 888,305. PATENTED MAY 19, 1908.
W. J. BUSSINGER.
SPOUT FOR SAUSAGE STUFFERS.
APPLICATION FILED APR. 5, 1907.
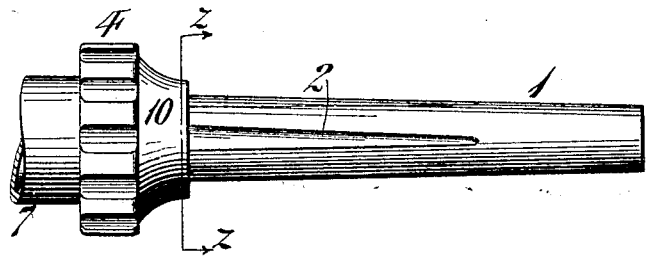
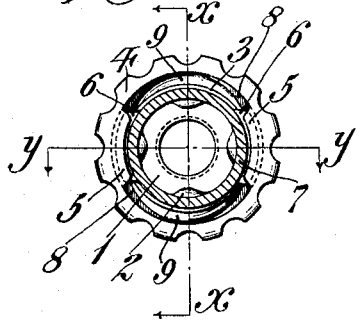 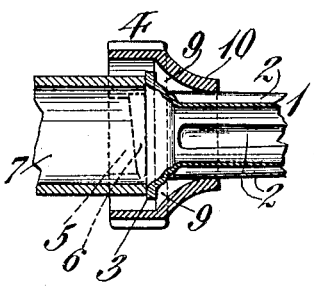 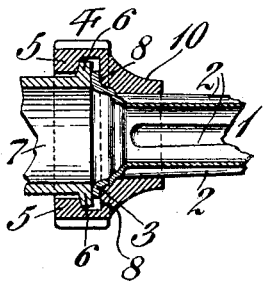
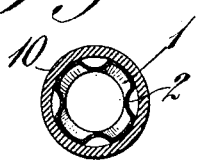 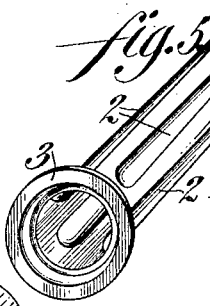
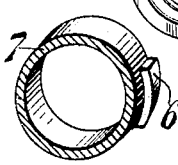
Witnesses
L. Rouville,
P. F. Nagle.
Inventor
William J. Bussinger,
By Wiedersheim & Fairbanks,
Attorneys

UNITED STATES PATENT OFFICE.

WILLIAM J. BUSSINGER, OF PHILADELPHIA, PENNSYLVANIA, ASSIGNOR TO NATIONAL SPECIALTY MANUFACTURING COMPANY, OF PHILADELPHIA, PENNSYLVANIA.

SPOUT FOR SAUSAGE-STUFFERS.

No. 888,305.  Specification of Letters Patent.  Patented May 19, 1908.

Application filed April 5, 1907. Serial No. 366,539.

*To all whom it may concern:*

Be it known that I, WILLIAM J. BUSSINGER, a citizen of the United States, residing in the city and county of Philadelphia, State of Pennsylvania, have invented a new and useful Spout for Sausage-Stuffers, of which the following is a specification.

My invention relates to a new and useful nozzle and coupling used in connection with sausage stuffers, lard presses and the like and consists in providing means for stiffening and strengthening the nozzle and for allowing air to escape from the casing of the sausage, as it is being stuffed.

It further consists of novel details of construction, all as will be hereinafter fully set forth.

Figure 1 represents a side elevation of a nozzle embodying my invention, showing the coupling and a portion of the pipe of the stuffer, to which the nozzle or spout is connected. Fig. 2 represents an end elevation from the left of Fig. 1 showing the coupling and the spout in position, the pipe on the sausage stuffer being broken. Fig. 3 represents a sectional view on line x—x, Fig. 2. Fig. 4 represents a sectional view on line y—y, Fig. 2. Fig. 5 represents a perspective view of the parts in detached position. Fig. 6 represents a sectional view on line z—z, Fig. 1.

Similar numerals of reference indicate corresponding parts in the figures.

Referring to the drawings: I have found in practice that nozzles and couplings for sausage stuffers, as at present formed, are objectionable, owing to the fact that the nozzles are easily bent and broken since the couplings bear upon only a small portion of the nozzles and in addition by placing the openings in the extension of the couplings, for the escape of the air, the same often become clogged and in some instances the sausage casing projects over these openings, thus effectually closing the same.

My invention is designed to overcome these objections and in the drawings I have shown a construction for carrying out my invention but it will be evident that changes may be made therein, which will come within the scope of my invention and I do not therefore desire to be limited in every instance to the exact construction as herein shown and described.

1 designates a nozzle having a series of longitudinally extending grooves 2 formed in the face thereof, which extend a suitable distance therein, and in the present instance from a point adjacent the flange 3 to a suitable point adjacent the outer end of the nozzle it being understood that the grooves are preferably deeper at the ends adjacent said flange and that they are preferably tapered.

4 designates a coupling which is adapted to be secured to the body of the stuffer or lard press in any suitable manner and in the present instance the coupling is provided with the lugs 5 which co-act with suitable lugs 6 on the pipe 7, which is connected with or forms part of the press, said pipe serving as the outlet for the same.

8 designates a shoulder on the interior of the coupling against which the flange 3 of the nozzle is adapted to rest and between which and the end of the pipe 7 the nozzle is clamped in position, as best understood from Figs. 3 and 4.

9 designates passages or grooves formed on the interior of the coupling, in the present instance, in the shoulder which can be of any desired extent and size and which form a communication from the end of the grooves 2 to the rear exterior of the coupling 4, it being understood that by this means, air is directed through the groove 2 and is discharged rearwardly to the exterior of the casing 4, thus permitting the escape of the air from the casing to the sausage as they are being filled.

10 designates a suitable extension on the coupling 4 which projects a suitable distance beyond the outer face of the coupling and which is integral with or connected to the coupling, it being noted that the exterior face of said extension is tapered or curved and that the end of the sausage casing can receive said extension, if desired, without interfering with the passage 9 so that the said passage will never become clogged and the air can freely escape rearwardly from the coupling.

Having thus described my invention, what I claim as new and desire to secure by Letters Patent, is:—

1. In a device of the character described, a nozzle having a groove therein, a flange on said nozzle, a coupling adapted to be secured to the sausage stuffer and holding said nozzle in position and the inner wall of the coupling and the back of the nozzle differing in shape to provide a space therebetween thus forming a communication between the groove in the nozzle and the rear of the coupling.

2. In a device of the character described, a nozzle having a groove therein, a flange on said nozzle, a coupling adapted to be secured to the sausage stuffer, a shoulder in said coupling against which said flange is adapted to rest, and a groove in said shoulder communicating with the groove in the nozzle whereby air can pass therefrom and discharge from the rear of the coupling.

3. In a device of the character described, a nozzle having a groove therein, a flange on said nozzle, a coupling adapted to be secured to the sausage stuffer, a solid extension on said coupling extending beyond the inner end of the groove, a groove in the interior of said coupling forming a communication between the groove of the nozzle and permitting escape of air from the rear of the coupling.

4. In a device of the character described, a nozzle, having a groove therein, a flange on said nozzle, a coupling having lugs thereon, a pipe on the sausage stuffer having lugs thereon adapted to engage with the lugs on the coupling and of smaller diameter than said coupling, a shoulder in said coupling against which the flange is adapted to rest, and a groove on the interior of said coupling forming a communication with the groove of the nozzle and the space between the pipe and said coupling.

5. In a device of the character described, a sausage stuffer having a spout connection, a grooved spout flanged to make contact with said connection and a coupling for joining the spout and spout connection, having an opening of irregular shape therein to permit travel of air between it and the spout through the length of the coupling.

WILLIAM J. BUSSINGER.

Witnesses:
WM. CANER WIEDERSEIM,
JOHN A. WIEDERSHEIM.